(No Model.)
J. H. FLAGLER.
DEVICE FOR WELDING TUBING.
No. 371,833. Patented Oct. 18, 1887.
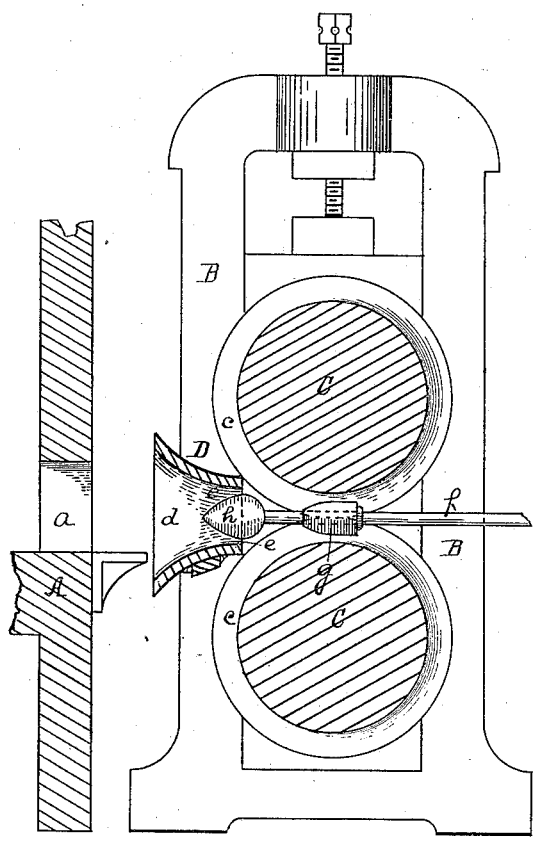
Fig. 1.
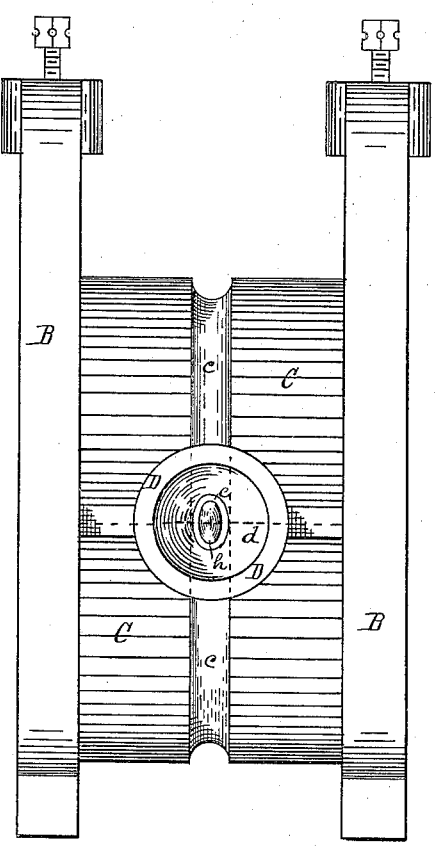
Fig. 2.
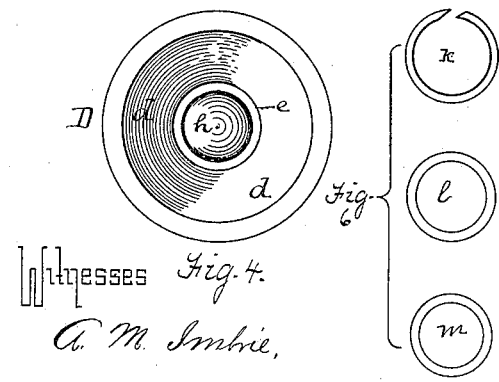
Fig. 4.
Fig. 6.
Fig. 5.
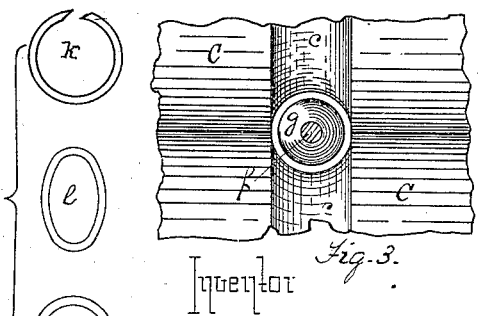
Fig. 3.
Witnesses
A. M. Imbrie,
J. M. Cooke
Inventor
John H. Flagler
by James I. Kay
Attorney

UNITED STATES PATENT OFFICE.

JOHN H. FLAGLER, OF NEW YORK, N. Y.

DEVICE FOR WELDING TUBING.

SPECIFICATION forming part of Letters Patent No. 371,833, dated October 18, 1887.

Application filed March 8, 1883. Serial No. 87,420. (No model.)

*To all whom it may concern:*

Be it known that I, JOHN H. FLAGLER, of New York, in the county of New York and State of New York, have invented a new and useful Improvement in Apparatus for Welding Tubing, (Case A;) and I do hereby declare the following to be a full, clear, and exact description thereof.

My invention relates to the apparatus employed for welding tube-skelp into tubing, and has special reference to the formation of lap-welded tubing, though it may also be employed to advantage in the formation of butt-welded tubing.

The usual method of welding lap-weld tubing has been to pass the tube-skelp, heated to a welding heat, between concave welding-rolls having a welding ball or mandrel supported between them, the rolls pressing the lapping edges of the skelp against the ball and forming the weld. The tube thus formed was then still further compacted and reduced and brought to proper cylindrical form by passing through concave or other finishing-rolls. Difficulty has been found in this method of manufacture, because, as the bed of the welding-furnace was generally slightly below the welding-rolls, the skelp was not presented squarely to the rolls, and consequently the forward end of the tube was often imperfectly welded and was necessarily cut off, thus making the tube shorter than the regular length, these "shorts" selling for less proportionately than the regular tubing. It was also found that if the plate from which the skelp was formed was slightly narrower than required for the tubing as the tube was welded for the first time around the ball or mandrel, the edges would not lap sufficiently, and consequently the tube formed was worthless. The heating and bending of the tube-skelp from the metal plate was also liable to open the skins and fiber of the metal slightly and form "pin-holes," which would not be closed in the welding-rolls, and in the subsequent testing of the tubing the tubing would leak at the small pin-holes so formed, and would consequently be reduced in value.

The object of my invention is to improve the manufacture of this wrought-metal tubing, and, among other things, overcome the objections to the former mode of manufacture.

My invention consists, first, in the combination, in apparatus for welding tubing, of a welding-bell and welding and reducing rolls mounted back of and in line with the bell, so that the skelp is delivered from the furnace through the welding-bell into the rolls, being first lapped and welded in the bell and then more firmly welded and reduced in the rolls, and the two operations of welding and reducing the tubing being accomplished in the same apparatus and at the same heat; second, in combining with the welding-bell and welding and reducing rolls suitable balls or mandrels within both bell and rolls to support the metal during the welding and reducing operations; and, third, in the combination of the bell and rolls where the passage or opening of the welding-bell is oblong or oval, so that the skelp passing through it is formed into an oblong welded tube, and is then more firmly welded and brought to proper cylindrical form in the rolls.

To enable others skilled in the art to make and use my invention, I will describe its construction and operation, referring for that purpose to the accompanying drawings, in which—

Figure 1 is a longitudinal section of my improved apparatus, the balls or mandrels being shown in full lines. Fig. 2 is a face view of the same. Fig. 3 is a face view of part of the rolls with the ball or mandrel between them. Fig. 4 is a face view of the welding-bell where the opening through it is circular. Fig. 5 shows the different stages of the metal where the opening in the bell is oblong, and Fig. 6 shows the different stages of the metal where the opening in the bell is round.

Like letters of reference indicate like parts in each.

In the drawings, A represents the end of a suitable tube-welding furnace, the delivery-port *a* of which is opposite the welding bell and rolls. The housings B B of the welding-rolls are of the usual construction, and the rolls C C are mounted therein and connected with power in the usual manner. These rolls have the semicircular grooves *c c*, which form the circular pass through which the tube passes.

Supported in front of the rolls C is the welding-bell D, which rests in a suitable frame extending out from the housing, and is mounted so that its welding passage or opening $e$ is in line with the pass of the rolls. This bell has a large flaring mouth, $d$, opposite the port $a$ of the furnace, this flaring mouth directing the skelp from the port into the welding-passage $e$ of the bell. The passage $e$ of the bell may either be oblong, as shown in Figs. 1 and 2, or circular, as shown in Fig. 4. The oblong shape is preferred where no ball is employed in the bell in making either butt-weld or lap-weld tubing, as the oblong or oval tubing is not so liable to "sag down" or fall when passing from the bell to the rolls. Where a ball is employed in the bell either form may be employed, though practical experience shows that more "work" is imparted to the tubing where the skelp is welded in the bell into oblong form and afterward brought to proper cylindrical shape in the rolls, and that a better tube is consequently formed. The passage $e$ in the bell differs in size from the pass in the rolls, according to the required reduction of the tubing in the rolls, the amount of reduction differing according to the thickness or size of the tubing. Where the welding-passage of the bell is oval it is made of proper size to accommodate the same size tube as the ordinary circular passage. The mandrel-bar $f$ is supported and operated in the ordinary way in welding apparatus, and it supports the ball or mandrel $g$ between the rolls and the ball or mandrel $h$ within the welding-bell, the ball $g$ resting against a shoulder on the bar and the ball $h$ fitting over the end of the bar. Where a ball is employed within the bell the space around the ball is slightly larger than the thickness of the metal in the tubing, so that the tube will not bind between the bell and the ball, and therefore will not require so great force in pushing it through the bell into the rolls. The ball employed with the bell having an oblong passage of course corresponds in shape to the passage.

When my improved tube-welding apparatus is employed, the skelp, previously bent to the form shown at K in Fig. 5 or 6, is brought to a welding heat in the furnace. It is then pushed by the operator or by suitable machinery at the opposite end of the furnace through the port $a$ and into the bell D, in which its edges are lapped and welded, and then through the bell into the rolls C C, which bite upon it and draw it through the bell, and finally deliver it a welded and reduced tube. As the skelp enters the bell the tapering sides thereof draw the edges together and lap its edges, and when it enters the passage $e$ these edges are brought together and welded, so that it leaves the bell a welded tube, as shown at $l$, being either oblong or circular, as shown in Fig. 5 or 6, according to the shape of the passage in the bell. As the edges are gradually bent over and the metal is at a high heat, the extreme forward edges of the tube lap and weld in the bell whether the skelp is presented to the bell squarely or on a slight incline, and the forward end of the tube is therefore introduced into the rolls properly lapped and welded, so that there is not the liability of its being imperfectly welded which was experienced in the ordinary welding-rolls. As the tube is drawn through the bell, which remains stationary, the outer surface of the metal is "sized," a "skin" being formed thereon, which cannot be obtained in rolls which move with the metal, and this skin closes all the small "pin-holes" or "pock-marks" caused by the opening of the fiber on the bending of the metal or otherwise, and so overcomes this objection to tubing formed in rolls. As the tube, $l$, formed in the bell passes into the rolls, it is caught by them and pressed against the ball between them, and the lapped and welded edges pressed into each other, and thus more firmly welded, a strong union of the welded edges being thus insured, because the metal has not had time to cool. The tube is also reduced to smaller diameter and the metal thereof worked so as to improve its quality, a finished tube such as that shown at $m$ being produced. In case the plate from which the tube is formed is slightly narrow, as above referred to, it is first properly lapped and welded in the bell, and as it passes to the rolls a welded tube, in which it is both pressed against the bell and reduced at a welding heat, a full and perfect lap is formed, the metal at the lap being pressed over and the weld perfected at the same time the tube is reduced, so that, though the tube may not be so greatly elongated, a perfect tube is formed. As the tube is welded in the bell and reduced in the rolls, which also draw it through the bell, there is not the liability to stretch or to buckle the tube experienced where reducing-rolls are mounted after welding-rolls, on account of the elongating of the metal and the difference in the speed in the rolls. I am also enabled to reduce the tube just after leaving the furnace, as the reducing-rolls may be mounted as near the furnace as the ordinary welding-rolls, and therefore do not require so much power as in the ordinary reducing-rolls employed after the tube has been welded in rolls.

My improved apparatus will also be found advantageous for forming butt-weld tubing, the skelp being butted and welded in the bell, and then the edges pressed into each other and the tube reduced in the rolls, and where no mandrels are used the smaller sizes not heretofore formed by rolls can be advantageously made.

What I claim as my invention, and desire to secure by Letters Patent, is—

1. In an apparatus for welding and reducing tubing, the combination of a welding-bell, welding and reducing rolls mounted back of and in line with the bell, and a mandrel supported between said rolls, substantially as and for the purpose set forth.

2. In apparatus for welding and reducing tubing, the combination of a welding-bell, welding and reducing rolls mounted back of and in line with the bell, and balls or mandrels supported within the bell and rolls, substantially as and for the purposes set forth.

3. In apparatus for welding and reducing tubing, the combination of a welding-bell having an oblong or oval welding-passage, welding and reducing rolls mounted back of and in line with the bell, and a mandrel supported between said welding-rolls, substantially as and for the purpose set forth.

In testimony whereof I, the said JOHN H. FLAGLER, have hereunto set my hand.

JOHN H. FLAGLER.

Witnesses:
JAMES I. KAY,
J. N. COOKE.